(12) United States Patent
Ophardt et al.

(10) Patent No.: US 7,765,916 B2
(45) Date of Patent: Aug. 3, 2010

(54) LEVER WITH SHIFTING FULCRUM POINT

(75) Inventors: Hermann Ophardt, Issum (DE);
Martin Anhuf, Kamp-Lintfort (DE)

(73) Assignee: Gotohti.com Inc., Beamsville, Ontario (CA)

( * ) Notice: Subject to any disclaimer, the term of this patent is extended or adjusted under 35 U.S.C. 154(b) by 798 days.

(21) Appl. No.: 11/655,230

(22) Filed: Jan. 19, 2007

(65) Prior Publication Data
US 2007/0169576 A1    Jul. 26, 2007

(30) Foreign Application Priority Data
Jan. 25, 2006   (CA)  .................................. 2533992

(51) Int. Cl.
*F01B 9/00*        (2006.01)
*F16H 35/08*       (2006.01)
(52) U.S. Cl. .......................................... 92/140; 74/834
(58) Field of Classification Search .................. 92/138, 92/140; 74/47, 522, 834
See application file for complete search history.

(56) References Cited

U.S. PATENT DOCUMENTS

| 4,031,785 | A |   | 6/1977  | Wheeler |
|-----------|---|---|---------|---------|
| 4,234,107 | A | * | 11/1980 | Gernlein .................... 74/834 |
| 5,182,967 | A | * | 2/1993  | Yoshizawa et al. ............. 74/834 |
| 5,362,214 | A | * | 11/1994 | Neward ..................... 417/440 |
| 5,570,607 | A | * | 11/1996 | Yoshizawa ................... 74/110 |
| 6,499,385 | B2| * | 12/2002 | Protti ....................... 92/140 |

FOREIGN PATENT DOCUMENTS

DE    26 02 491 AI      10/1976
DE    103 16 692 B3     11/2004

* cited by examiner

*Primary Examiner*—Michael Leslie
(74) *Attorney, Agent, or Firm*—Riches, McKenzie & Herbert LLP

(57) ABSTRACT

A lever with a shifting pivot or fulcrum point such that in pivoting of the lever between a first position and a second position for at least one angular segment of such pivoting about a first fulcrum point and for a second angular sector of such pivoting, pivots about a second fulcrum point.

17 Claims, 13 Drawing Sheets

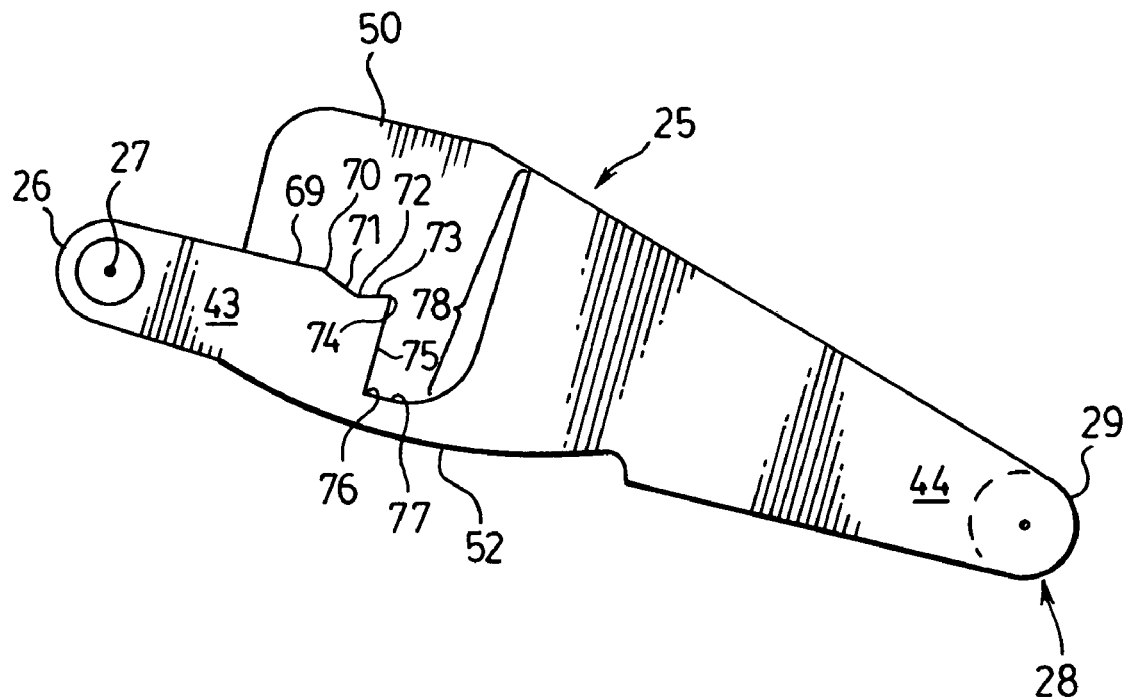
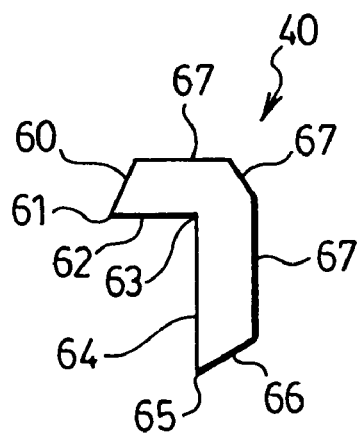

LEVER WITH SHIFTING FULCRUM POINT

SCOPE OF THE INVENTION

This invention relates to a lever which is pivotable about a fulcrum which shifts between pivot points as the lever is pivoted and, more particularly, to use of such a lever to activate a reciprocating piston pump.

BACKGROUND OF THE INVENTION

Fluid dispensers are known in which a piston pump has a piston which is adapted to be moved in a linear manner within a cylindrical chamber to pump fluid. The piston is coupled to a first end of a lever and a motor is connected to the second end of a lever with the lever pivoted about a pivot point between its first and second ends. The motor is adapted to move the second end of the lever upwardly and downwardly so as to translate this motion into upward and downward movement of the piston. A disadvantage of such an arrangement is that the first end of the lever reciprocally pivots about an arc centered on the fulcrum, pivot point which has the disadvantage of moving the first end of the lever which is connected to the piston in an arcuate motion rather than in a straight line as is preferred for linear coaxial sliding of the piston in the chamber. To the extent that the connection point of the piston with the lever moves in an arcuate rather than a linear manner, increased wear and the opportunity for failure of the seal between the piston and the chamber may result.

SUMMARY OF THE INVENTION

To at least partially overcome these disadvantages of previously known devices, the present invention provides a lever with a shifting pivot or fulcrum point such that in pivoting of the lever between a first position and a second position for at least one angular segment of such pivoting about a first fulcrum point and for a second angular sector of such pivoting, pivots about a second fulcrum point.

An object of the present invention is to provide a lever which pivots about a fulcrum arrangement with two or more pivot points, such that one end of the lever is moved through a path with multiple arcuate segments which more closely approximates a straight line than if the lever were merely pivoted about a single fulcrum pivot point.

Another object is to provide an improved lever linkage for use in a dispenser with a reciprocating piston pump.

Another object is to provide a lever which moves relative to a fulcrum by a rolling of the surfaces of the lever relative to surfaces of the fulcrum as by such rolling motion to maintain an end of the lever in pivoting of the lever through a path which more closely approximates a straight line than would result if the lever merely pivoted about a single fulcrum pivot point.

Another object is to provide a lever which, at different segments of its pivoting, pivots about different pivot points and, in addition at different points in its pivoting, rolls relative to the fulcrum.

In one aspect, the present invention provides a lever having two ends and pivotable about a fulcrum member in which during which pivotal movement in a first direction, the lever pivots during a first angular sector of pivoting about a first pivot point and during a second angular segment of pivoting about a second pivot point spaced from the first pivot point.

BRIEF DESCRIPTION OF THE DRAWINGS

Further aspects and advantages of the present invention will become apparent from the following description taken together with the accompanying drawings in which:

FIG. 4 is an enlarged side view of the lever shown in FIG. 1;

FIG. 5 is an enlarged view of the fulcrum member shown in FIG. 1;

DETAILED DESCRIPTION OF THE DRAWINGS

Figure 1:
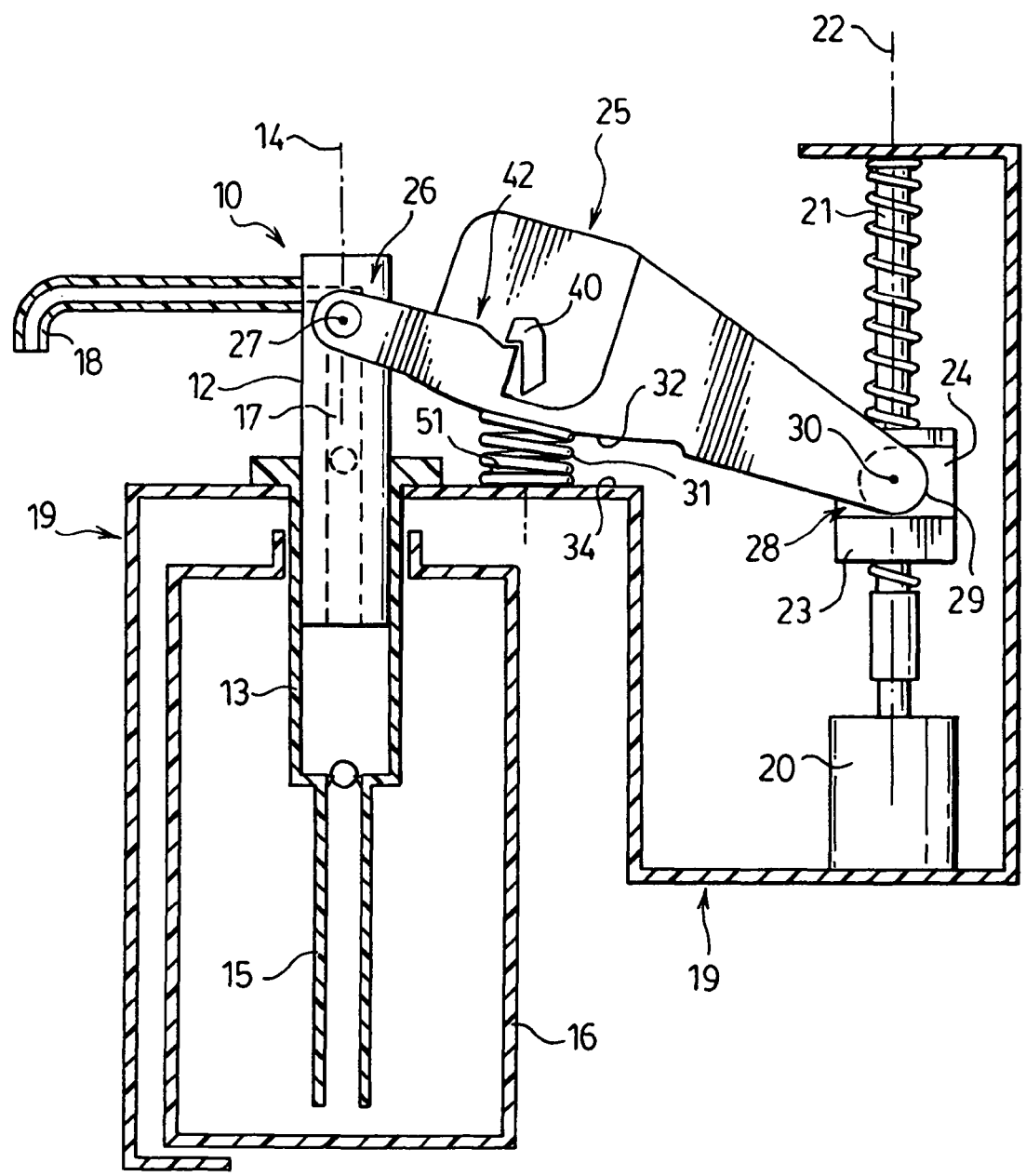
FIG. 1 is a schematic cross-sectional view of a fluid dispenser in accordance with the first embodiment of the present invention.

Reference is made to FIG. 1 which schematically illustrates a fluid dispenser carrying a piston pump 10 with a cylindrical piston 12 coaxial slidable within a cylinder 13 for linear sliding about axis 14 in a reciprocal motion between an extended position and a retracted position so as to draw fluid via a dip tube 15 from a reservoir bottle 16 through an internal passageway 17 in the piston 12 and out an outlet tube 18 as by interaction of a piston head formed on the piston and a pair of one-way ball valves. FIG. 1 schematically illustrates a housing plate 19 on which various elements are securedly mounted including the cylinder 13 and a reversible motor 20 adapted to drive a helically threaded shaft 21 for rotation about an axis 22 parallel to the axis 14. A drive nut 23 is threadably journalled onto the threaded shaft 21 such that with rotation of the motor 20 in one direction, the nut 23 moves upwardly and in rotation of the motor 20 in the other direction, the nut 23 moves downwardly. The nut 23 carries a horizontally disposed transverse slotway 24.

A lever 25 has a first end 26 pivotally mounted to the piston 12 for relative rotation about a horizontal axis 27 normal to the pump axis 14. The lever 25 has a second end 28 which carries a slide cam having cylindrical surfaces 29 disposed about an axis 30 extending horizontally normal to the axis 22 which cylindrical surfaces 29 are received in the slotway 24 and provide for horizontal left to right sliding of the second end 28 of the lever relative to the nut 23. As seen, the motor 20 and its threaded shaft 21 are effectively securely fixed to the housing plate 19, however, for relative rotation thereto.

A spring 31 is disposed underneath the lever 25 between an arcuate lower central surface 32 of the lever and an upwardly directed support surface 34 of the housing plate 19 such that the spring 31 biases the lever 24 upwardly into engagement with a fulcrum member 40 which, although not shown in FIG. 1, is fixedly secured to the housing plate 19 against movement. The lever 25 carries a fulcrum shoulder 42 adapted to engage with the fulcrum member 40 and thereby control the relative pivoting of the lever 25.

In operation, with rotation of the motor 20 in one direction, the nut 23 is moved upwardly moving the second end 29 of the lever 25 upwardly pivoting the lever 25 about the fulcrum member 40 and moving the first end 26 of the lever 25 downwardly thus, in an instroke, moving the piston 12 from its extended position to its retracted position dispensing fluid from the bottle 16 out the outlet tube 18. In an outstroke, the motor 20 is rotated in the opposite direction, the nut 23 is moved downwardly on the shaft 21 carrying the second end 28 of the lever downwardly pivoting the lever 25 about the fulcrum member 40 and moving the upper end 26 of the piston upwardly drawing the piston 12 upwardly and drawing fluid into the chamber 13 from the bottle 16.

Figure 2:
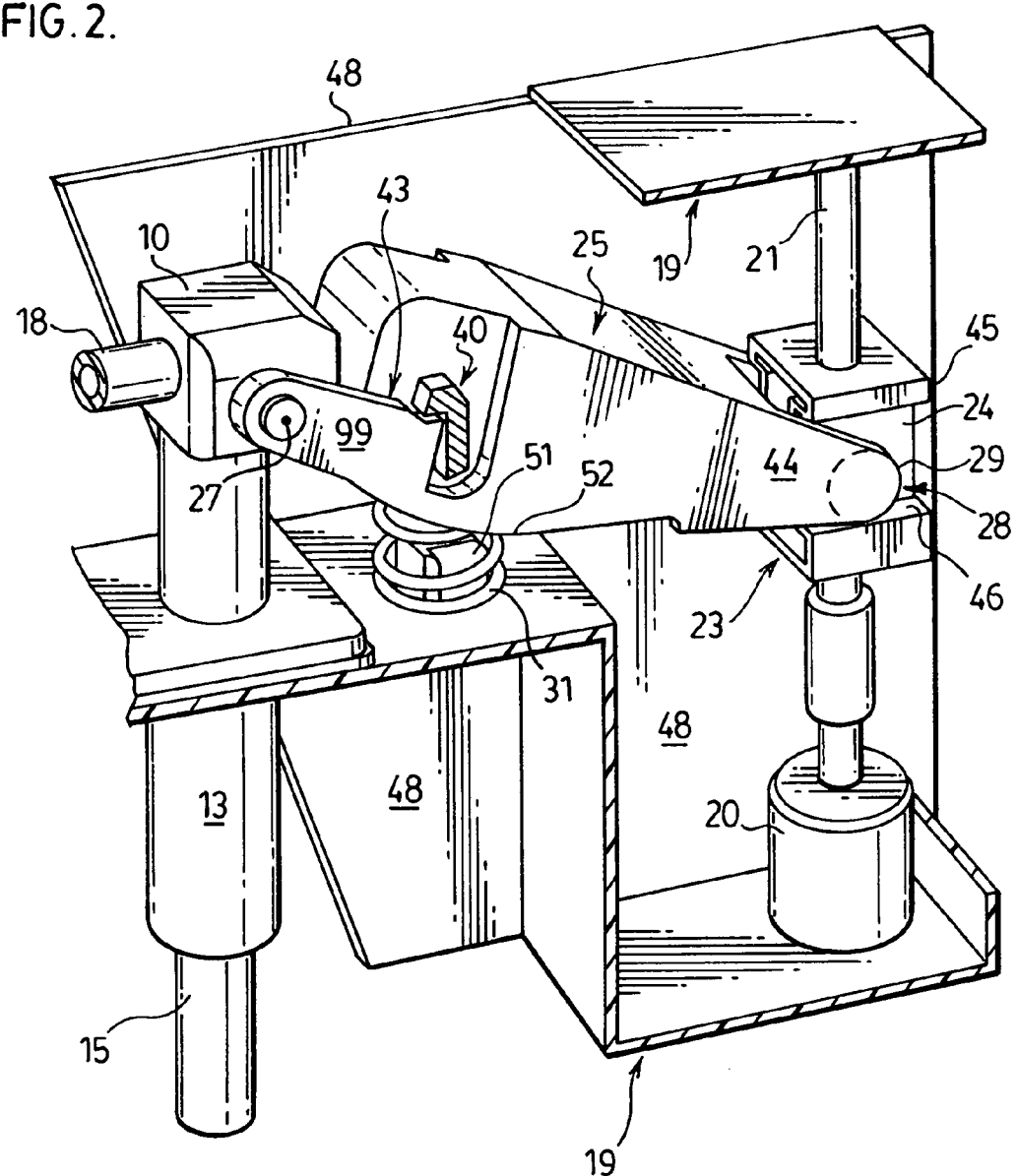
FIG. 2 is an enlarged schematic partially cut-away pictorial side view of a dispenser in accordance with a second embodiment very similar to that in FIG. 1 with the piston in an extended position.
Figure 3:
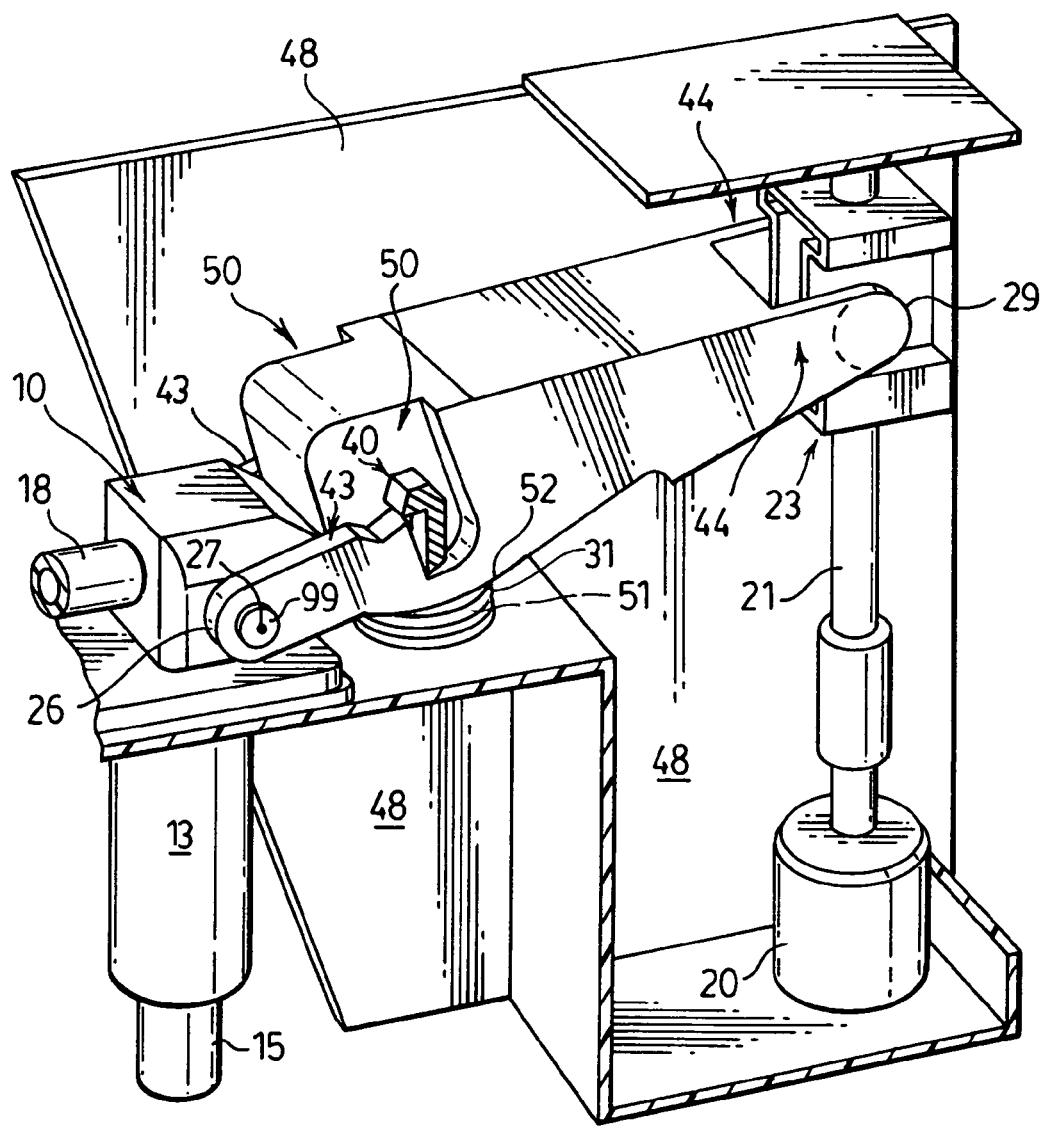
FIG. 3 is a view substantially the same as in FIG. 2, however, showing the piston in a retracted position.

Reference is made to FIGS. 2 and 3 which show a schematic, partially cut-away pictorial view of a second embodiment of the invention substantially the same as to its major components as that illustrated in FIG. 1.

As best seen in FIG. 3, the lever has at its first end 26 a pair of fixed arms 43 on each side which extend forwardly on each side of the upper end of the piston 12 with each of the arms 43 pinned to the piston 12 by a pin 99 for rotation about axis 27.

At the second end 28 of the lever, the lever also carries two arms 44, each of which has at its distal end, the cylindrical surface 29 sized to be received in the slotway 24 of the nut 23. The slotway 24 is formed to extend horizontally between and cut inwardly into the sides of the nut 43 as between two outwardly extending nut shoulders 45 and 46 on each side. The second end 28 of the lever 25 is thus moved upwardly and downwardly with the nut 23, however, the second end 28 is free to slide horizontally relative to the nut 23.

FIGS. 2 and 3 schematically illustrate the fixed housing plate 19. One vertical side support plate 48 is shown secured to the housing plate 19 and extends vertically upwardly therefrom on a far side of the lever 25 spaced laterally from the lever 25. This support plate 48 carries a fulcrum member 40 (not seen) on the far side of the lever 25 to extend laterally inwardly horizontally toward the lever 25 for engagement with the fulcrum shoulder 42 on the arm 44 on the far side of the lever 25. Two such vertical support plates 48 are provided being mirror images of each other, one on each side of the lever 25 although only the far vertical support plate 48 is shown in FIGS. 2 and 3. In FIGS. 2 and 3, the fulcrum member 40 illustrated represents the fulcrum member which is disposed on the near side of the lever 25. This fulcrum member 40 is shown in vertical cross-section where it extends laterally away from a vertical support plate 48 on the near side of the lever, not shown. The lever 25 has a portion of its side surface cut away proximate its first end 26 so as to provide a side recess 50 in to which each fulcrum member 40 extends laterally to be received therein. The recess 50 on each side of the lever 25 provides the fulcrum shoulder 42 shown as a rearward extension of an upper surface of each arm 43.

The spring 31 is shown as a helical spring disposed about a locating boss 51 carried on the housing plate 19 so as to maintain a lower end of the spring 31 on the housing 19 and with the upper end of the spring to engage a lower downwardly directed curved surface 52 on the lever 25 which is convex as seen in side view in FIG. 1.

Reference is made to FIGS. 4 to 8 which illustrate the embodiment of FIG. 1 and which other than in the particular configuration of the fulcrum 40 and the fulcrum shoulder 42 is identical to all the other embodiments. As seen, for example, in FIG. 5, the fulcrum member 40 has an upper end face 60, an upper apex 61, a horizontal face 62, a corner 63, a vertical face 64, a lower apex 65 and a lower end face 66. Back surfaces 67 join the lower end face 66 to the upper end face 60.

The lever's fulcrum shoulder 42 comprises a top surface 69, a corner 70, a surface 71, a corner 72, an upper face 73, an apex 74, a middle face 75, a corner 76, a lower face 77 and a back face 78.

Figure 7:
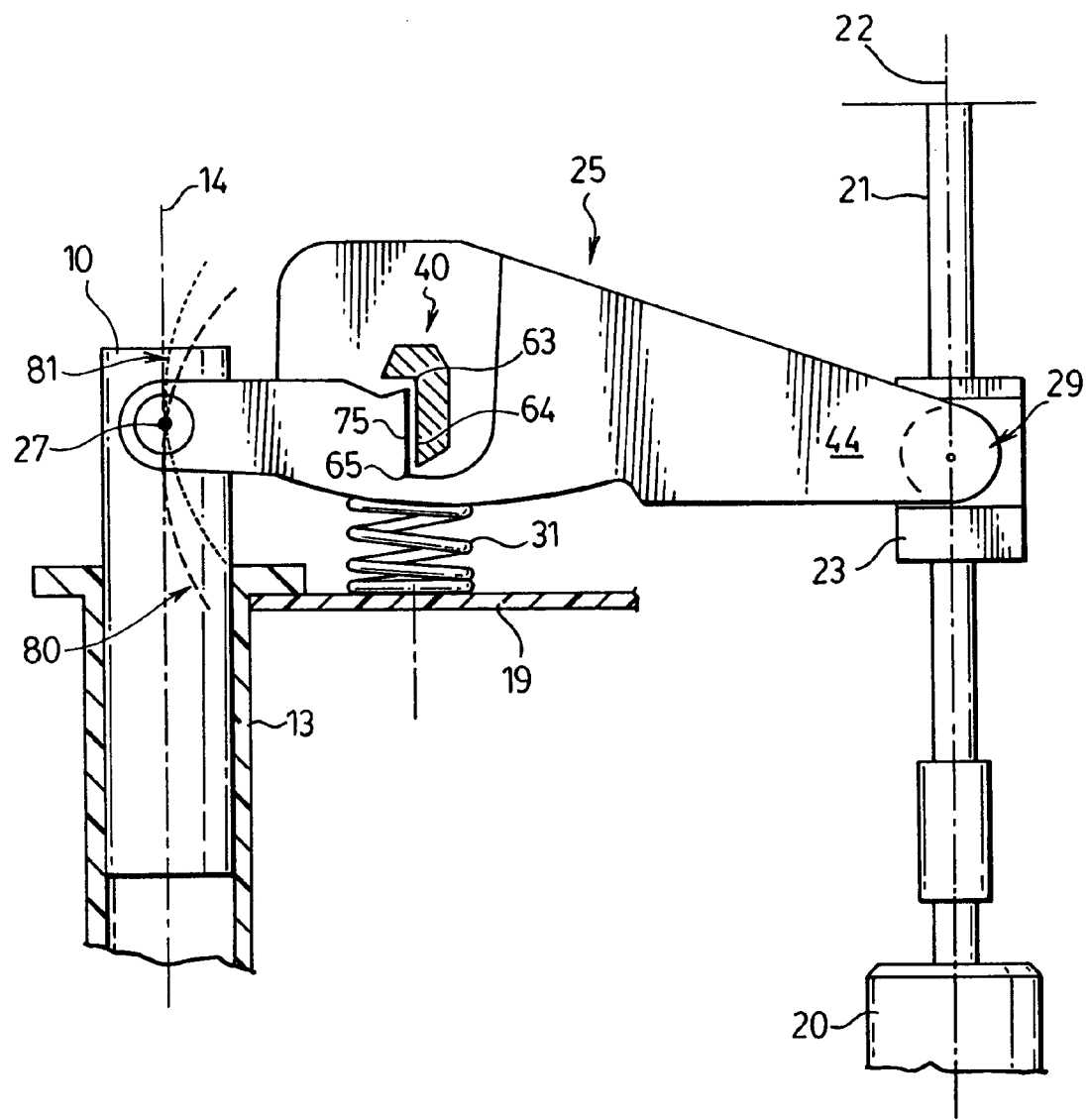

Referring to a neutral position illustrated in FIG. 7, the lever 25 is disposed with the mid face 75 parallel to and in opposition with the vertical face 64 of the fulcrum member 40. The mid face 75 is shown to be of the same length as the vertical face 64 such that the apex 74 of the lever 25 is engaged in the corner 63 of the fulcrum member and the lower apex 65 of the fulcrum member 40 is engaged in the corner 76 of the lever 25. Preferably, in this position, the vertical face 64 and the mid-face 75 are parallel to each other and each are parallel to the piston axis 14.

Figure 8:
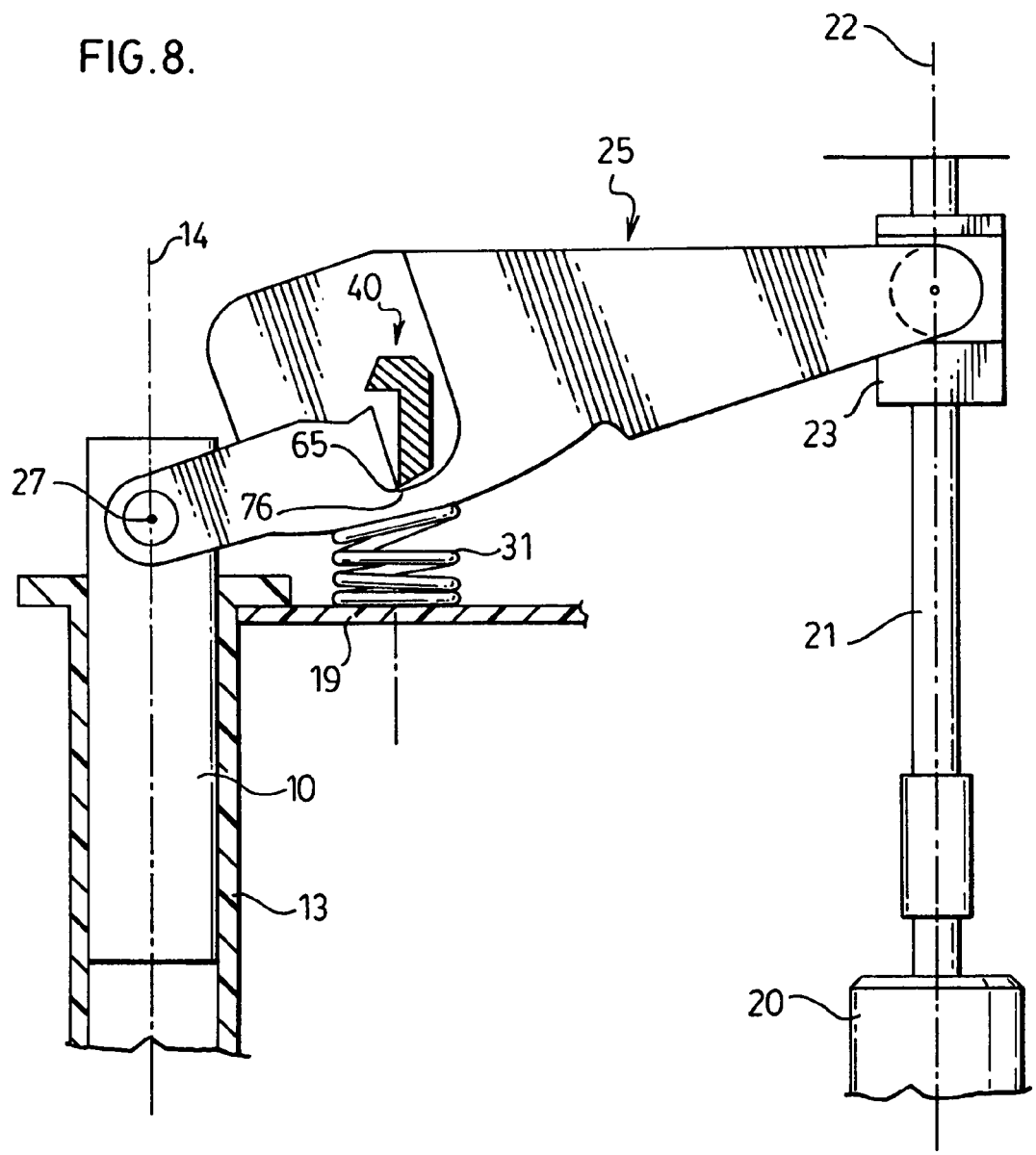

From the position of FIG. 7, on movement of the nut 23 upwardly, the lever 25 will pivot with the point of pivoting being the lower apex 65 of the fulcrum member 40 as engaged in the corner 76 of the lever 25. FIG. 8 illustrates a retracted position of the piston in which there is pivoting about the lower apex 65 and corner 76 until such time as the lower end face 66 may come into engagement with the lower face 77.

Figure 6:
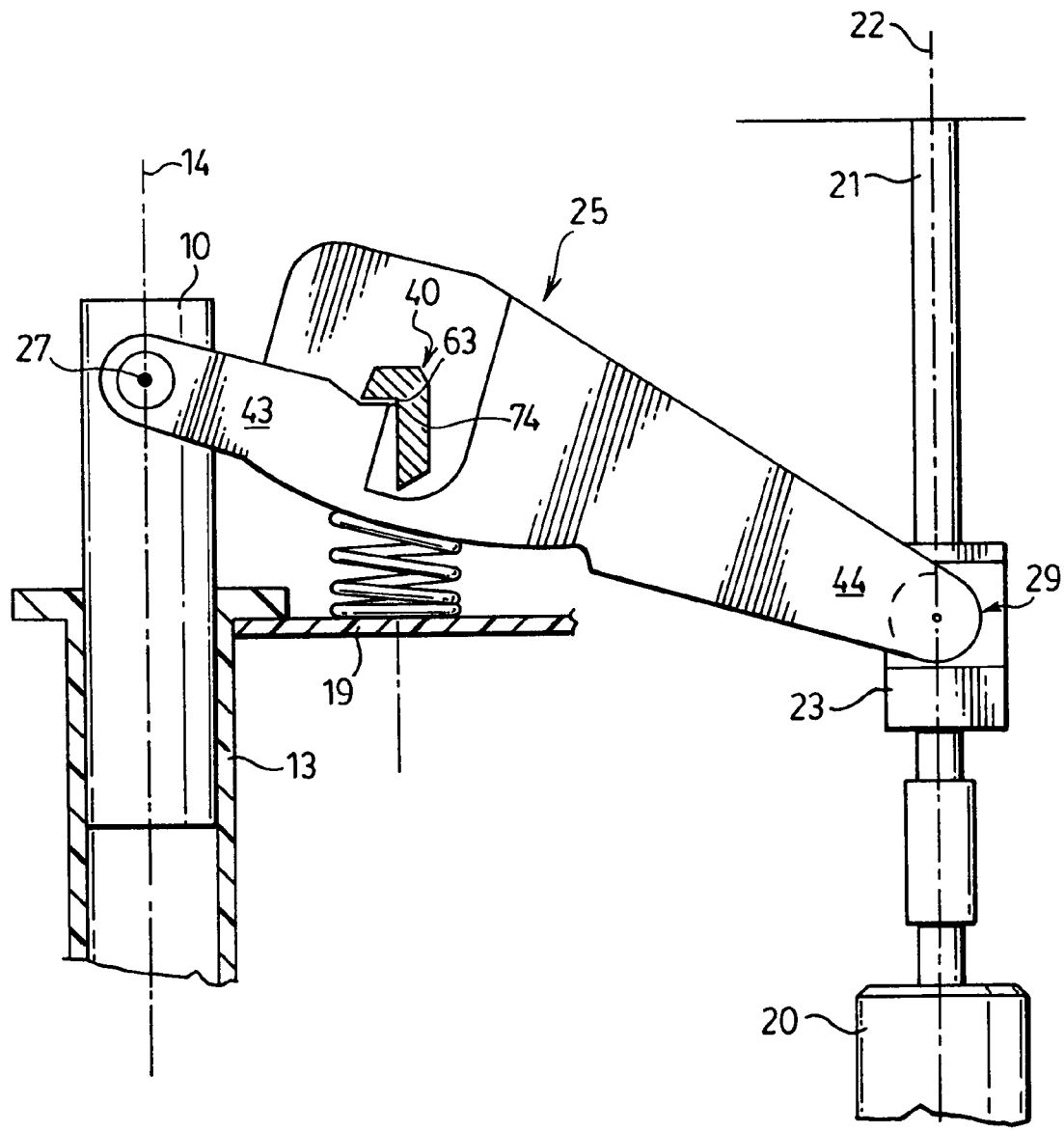
FIGS. 6, 7 and 8 are, respectively, schematic side views of selected portions of the dispenser of FIG. 1, however, showing with the piston in, respectively, an extended position, an intermediate position and a retracted position.

From the position of FIG. 7, with movement of the nut 23 downwardly, the lever 25 pivots relative to the fulcrum member 40 by engagement between the apex 74 of the lever 25 in the corner 63 on the fulcrum member to relatively pivot the inner end 26 of the lever upwardly to the position of FIG. 6 or therepast until the upper face 73 on the lever 25 may come into engagement with the horizontal face 62 of the fulcrum member 40.

In FIG. 7, an arc 80 shown in dashed lines is an arc of constant radius about lower apex 65 of a radius equal to the distance between the corner 76 and the axis 27. An arc 81, shown in dotted lines, is an arc of constant radius through the corner 63 of a radius equal to the distance between the apex 74 and the axis 27. In movement from the position of FIG. 7 to the position of FIG. 6, the axis 27 moves along the arc 81. In movement from the position of FIG. 7 to the position of FIG. 8, the axis 27 moves along the arc 80. Thus, the path of movement from the position of FIG. 6 to the position of FIG. 7 and, hence, to the position of FIG. 8, is along arc 81 to a center point illustrated as a point of axis 27 in FIG. 7 and, hence, along arc 80. Following the path of the two arcs 81 and 80 over each half of the movement keeps the axis 27 closer to the vertical axis 14 of the piston than would be the case if the lever 25 merely pivoted about a single pivot point, for example, mid way between the apex 65 and corner 63 and having a radius equal to the distance between the apex 74 and the axis 27.

Figure 9:
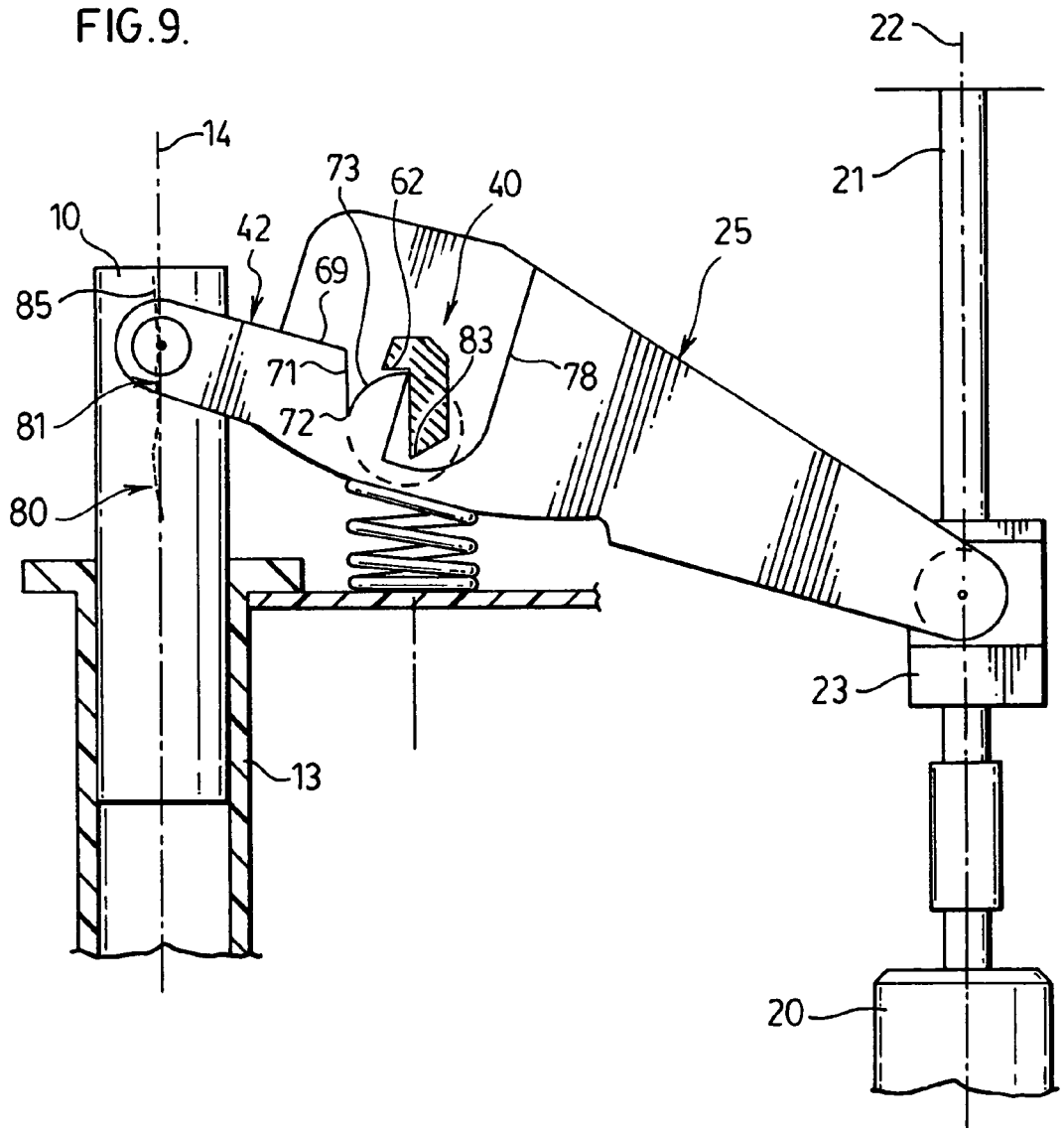
FIG. 9 is a view the same as FIG. 4 but showing a modified third embodiment.
Figure 10:
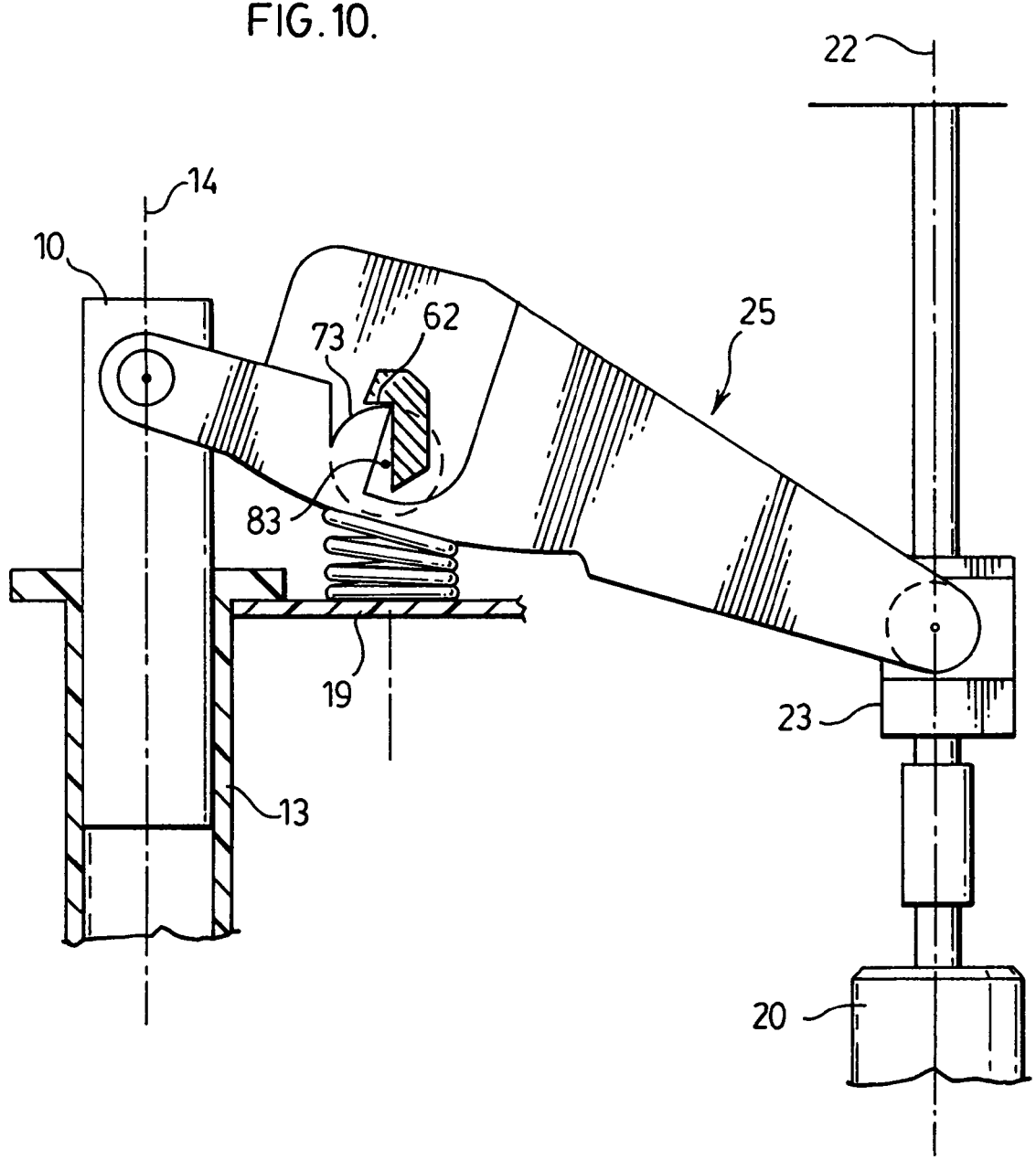
FIG. 10 is a view similar to FIG. 7 but with the piston in a more fully extended position.

Reference is made to FIGS. 9 and 10 which illustrate a third embodiment of the invention identical to that shown in FIGS. 4 to 8, however, in which the shoulder 42 of the lever 25 has been modified such that the upper face 73 is arcuate forming a segment of a circle shown in dotted lines in FIG. 9 about a notional axis indicated as 83. The apex 74, however, is disposed at the same location as in FIGS. 4 to 8. The face 71 has been adjusted to bridge the face 69 to the apex 72 at the left hand side of the upper face 73. In moving from the position of FIG. 9 to the position of FIG. 10, the curved upper face 73 is in frictional engagement with the horizontal face 62 such that the curved upper face 73 frictionally engages and rolls on the horizontal face 62. In such rolling movement from the position of FIG. 9 to the position of FIG. 10, the notional axis 83 is moved towards the right in a direction parallel to horizontal face 62 thus moving the axis 27 marginally towards the right which assists in compensating to the left with increased angulation of the lever away from the vertical axis, the axis 27 to be moved in an arc towards the left. On FIG. 9, there is schematically shown a path of motion representing movement of the axis 29 with initial pivoting about corner 76 following arc 80 then for pivoting about corner 63 to follow arc 81 to point 84 and then rolling of arcuate face 73 upon the horizontal face 62 for movement along an arc schematically illustrated as 85.

In a similar manner to that in which the lever is provided with an arcuate face 73 to roll the lever such that the axis 27 of the lever is relatively moved towards the right as it moves at the end of its stroke upwardly, a similar rolling action may be provided such that in an arrangement as illustrated in FIGS. 4 to 8, on movement of the nut 23 upwardly from the position of FIG. 8, rolling engagement between the shoulder 40 on the lever 25 and the fulcrum member 40 may also tend to move the first end 26 and its axis 27 towards the right hand side as contrasted with mere pivoting about the apex 65 which would tend to arcuately move the axis 27 away from the axis 14.

In the preferred embodiment of FIGS. 4 to 10 illustrated, the vertical face 64 has been shown to be parallel the axis 14, the mid-face 75 has also been shown to be straight and the apex 74 and the corner 76 are shown to be equally distant from the axis 27. As well, the horizontal face 62 has been shown to be horizontal and at right angles to the vertical face 64. To be appreciated, these relationships are preferred but not necessary and various other angles, orientations, distances and arrangements may be developed which permit for pivoting at two different pivot points notionally indicated by the location of apex 65 and apex 74.

In the embodiment of FIGS. 9 and 10, the upper face 73 is shown to be arcuate for rolling. It is to be appreciated that a similar result could be adopted by having the lever shoulder 42 having the configuration as illustrated, for example, in FIGS. 4 to 6 and the face 62 of the fulcrum member 40 having an arcuate surface. As well, it is to be appreciated that both the face 73 may be arcuate as illustrated in FIG. 9 and the face 62 may be arcuate. The face 62 needs to be chosen so that the lever 25 remains in engagement with the fulcrum member 40.

Figure 11:
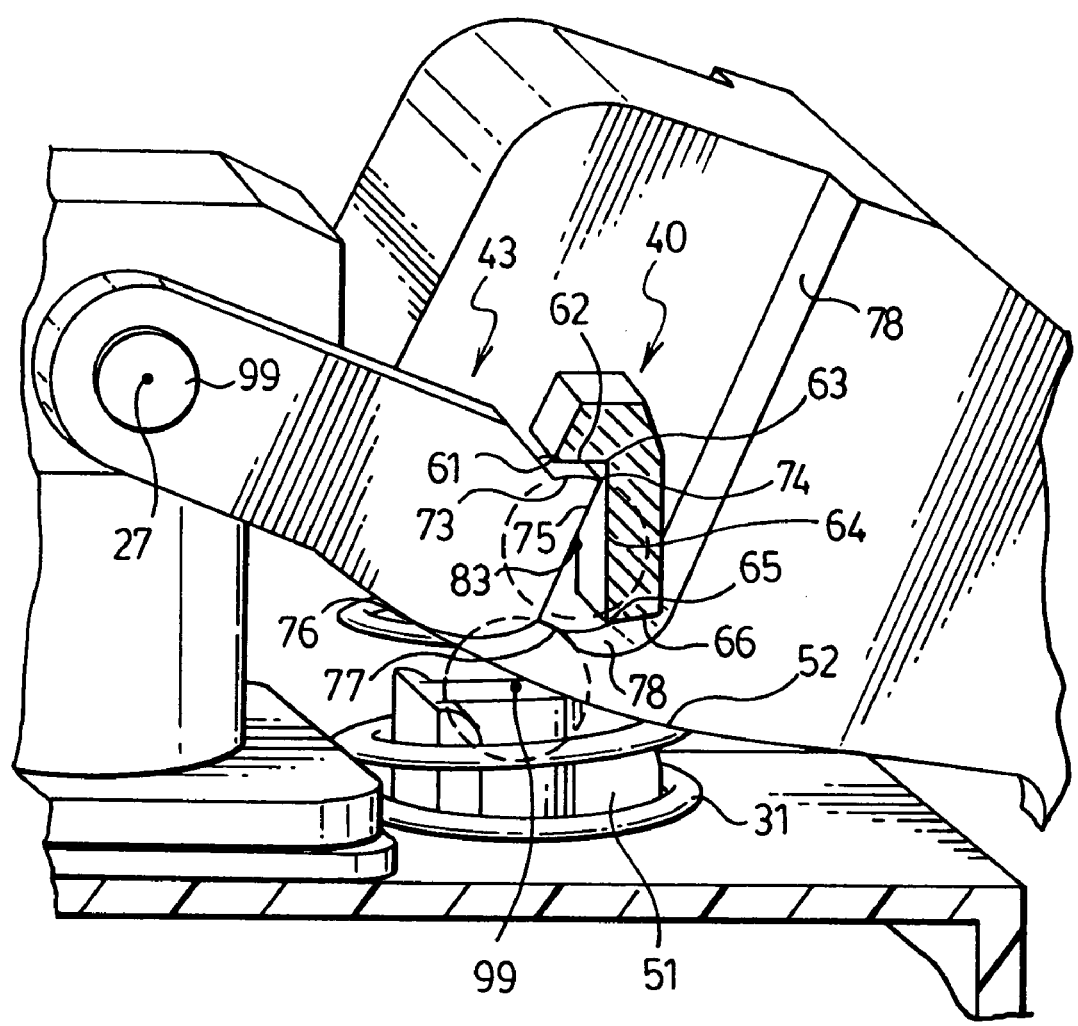
FIG. 11 is an enlarged view of a portion of FIG. 2.

Reference is made to FIG. 11 which is an enlarged view of FIG. 2 illustrating that upper face 72 is arcuate, as a segment of the dashed line circle about center 83 as was the case in FIG. 9 for rolling with face 62. Also, surface 77 is arcuate as a segment of the dashed line circle about center 99 for rolling with face 66, which also assists in slightly moving the axis 27 towards the left in the last part of an instroke.

To keep opposed rolling surfaces such as upper face 73 and face 62 in FIG. 11 in rolling engagement, the surfaces are preferably frictionally engaged against relative sliding.

The preferred embodiments illustrate pivoting between the lever and fulcrum member about two different pivot points, however, pivoting may be arranged for pivoting about three, four or as many pivot points as desired so as to provide a number of successive curves such as 80 and 81 for each pivot point to better approximate linear travel.

In the preferred embodiments, the back faces 67 of the fulcrum member 40 is disposed having regard to the back face 78 of the shoulders 40 such that they do not lead to undesired interference.

Figure 14:
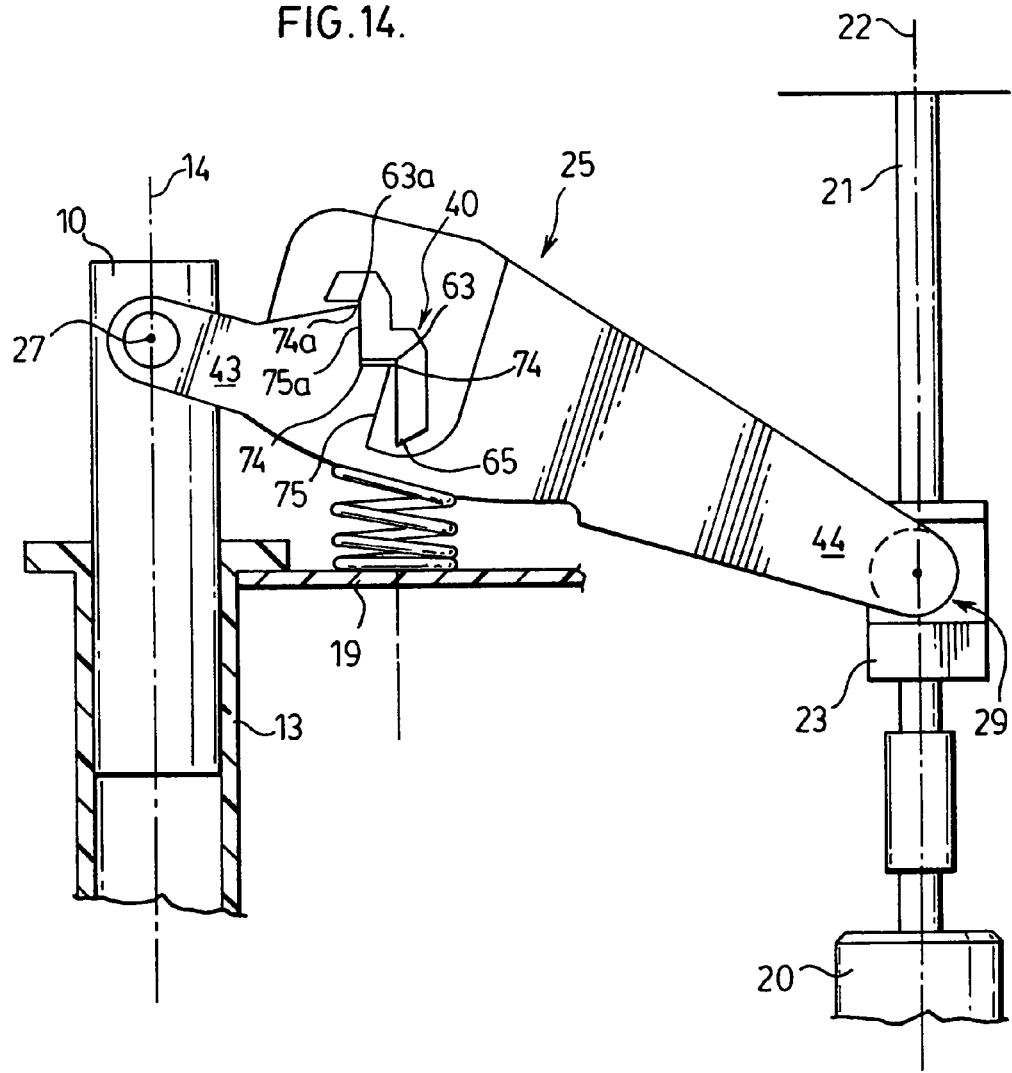
FIG. 14 is a view similar to FIG. 6 but of a modified embodiment.

FIG. 14 illustrates an embodiment similar to that in FIG. 6, however, in which the fulcrum member 40 and lever 25 interact for successive pivoting about corner 65, apex 63 and apex 63a, with the fulcrum member 40 of FIG. 6 being effectively duplicated in FIG. 14, as is the surface 75 as 75a and 74 as 74a.

Capacitive Communication

Figure 12:
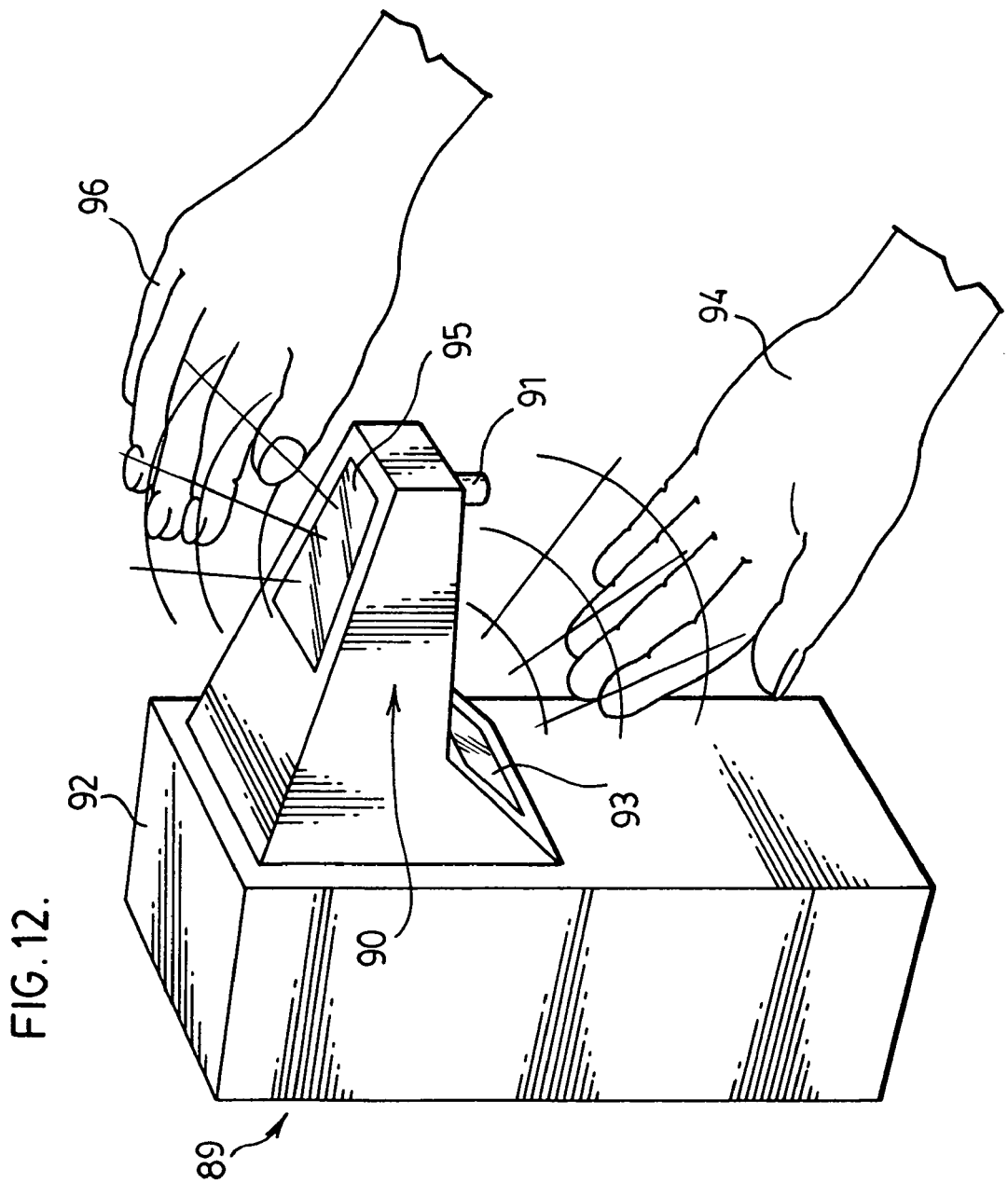
FIG. 12 is a pictorial view of a touchless fluid dispenser in accordance with a fifth embodiment of the invention as activated by a user's hands.
Figure 13:
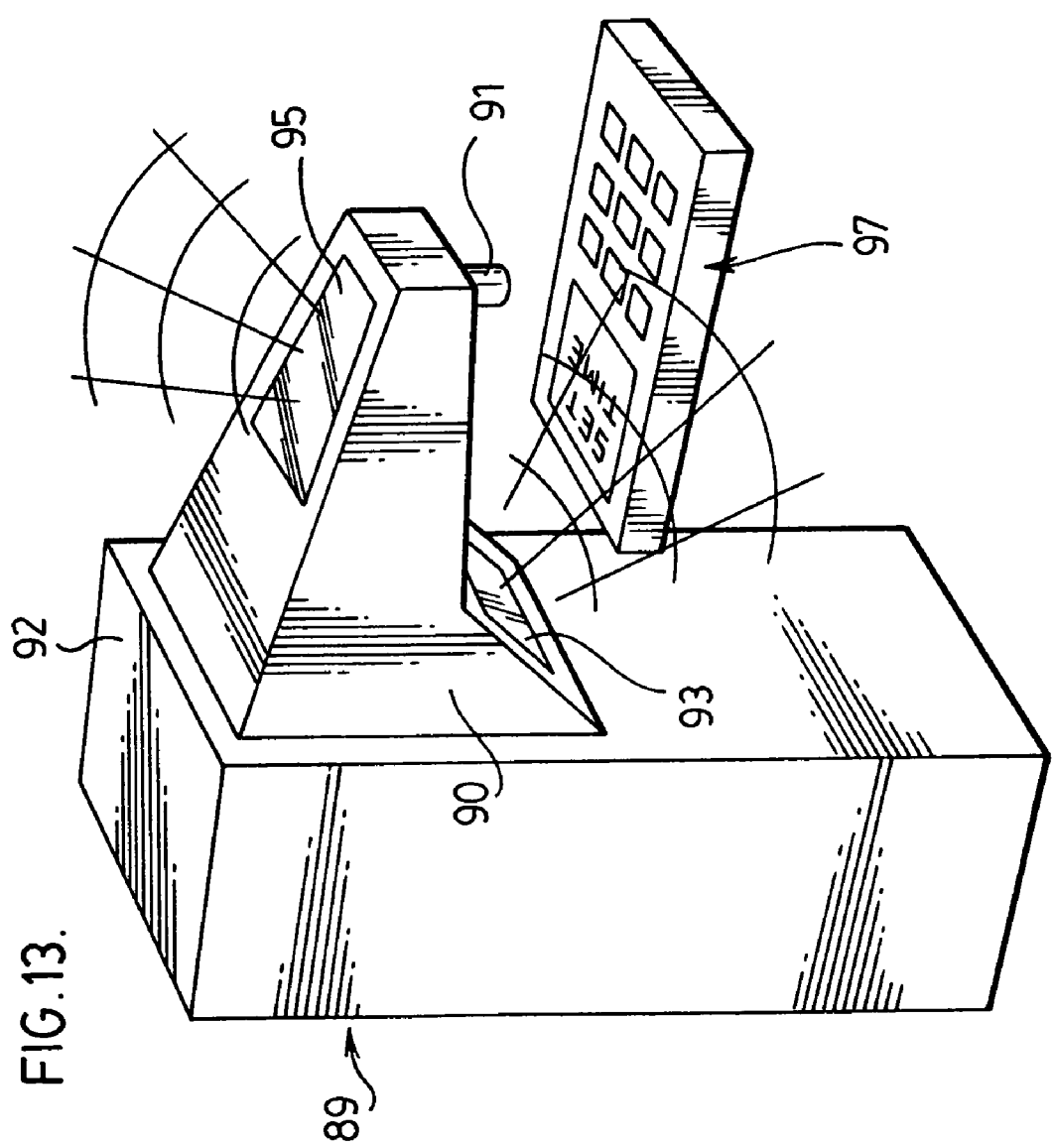
FIG. 13 is a pictorial view of the dispenser of FIG. 12 as communicating with a hand held control unit.

FIG. 12 is a schematic representation of the external appearance of a touchless fluid dispenser 89 to house a motor driven piston pump of the type illustrated in FIGS. 1 to 11 and in which the discharge nozzle extends forwardly within a nozzle guard 90 for discharge vertically downwardly from a nozzle outlet 91. The nozzle guard 90 is seen to extend forwardly from a generally rectangular housing 92 which contains the piston pump and bottle.

The operation of the motor 20 for dispensing is controlled touchlessly by the dispenser having one or more sensors which sense the presence of a user's hand or hands. In FIG. 12, two sensors are provided being a first sensor 93 to sense a user's first hand 94 to receive fluid underneath the outlet 91 and a second sensor 95 to sense a second user's hand 96 located above the nozzle guard 90. This arrangement with two sensors can be useful, for example, to require as a prerequisite to dispensing, simultaneous sensing of the presence of both hands, that is, requiring the user's second hand 96 to be placed above the nozzle guard 90 as can be advantageous to avoid dispensing when not desired as to a false signal.

In any event, whether there is only one sensor or two or more sensors, in accordance with the present invention, it is preferred that there be one sensor which is a capacitive sensor. A typical capacitive sensor senses the changes in capacitance when, for example, a mass such as a person's hand is moved proximate the sensor. Preferably, the capacitive sensor is one which has an ability to control and vary the frequency under which a magnetic flux is generated and measured. Preferably, the capacitive sensor generates and monitors electromagnetic field proximate the sensor.

In accordance with the present invention, the dispenser 89 is preferably provided with a control device, preferably a hand held battery operated controller 97 which can provide for communication, whether one way or preferred two way, between the dispenser 89 and the control device. The sensor, whether 93 or 96 which is a capacitive sensor, is used as a transmitter and/or receiver. As a transmitter, the capacitive sensor 93 will transmit electromagnetic signals to the hand held device which acts as a receiver. The capacitive sensor generates, for example, a field at varying frequencies and/or amplitudes which can be picked up as an information transferring signal by the hand held device as a receiver. For the capacitive sensor to act as a receiver, the hand held device would generate a field at appropriate varying frequencies and/or amplitudes which are adapted to be sensed by the capacitive sensor.

The range of transmission need not be large and can be small, for example, merely in the range of 1 cm to 10 cm insofar as the hand held control device may be placed in close proximity to the capacitive sensor.

The hardware, such as the control circuitry or control circuit for the capacitive sensor, preferably include an ability to change frequency and amplitude of emitted radiation as is preferred to set up the sensor for use as a capacitor sensor in different environments and applications with different sensitivities to provide for normal dispensing operation. By merely adjusting the software provided for such a capacitive sensor, without the need for any additional hardware, the capacitive sensor may be adapted for use for in exchange of data with the controller 97. Communication can be for many purposes including initializing use of the dispenser, setting up and/or adjusting operation parameters and/or settings for the dispenser, and receiving feedback and data as to the current and historical operation of the dispenser including, for example, the frequency of use, the number of uses in a time period and the like. The controller 97 may preferably comprise a portable battery operated hand held control with an information display screen to display information visually to a user and an input key as for manual alpha numeric input. Of course, each of the capacitive sensor and the controller would be provided with a computerized system enabling interpretation and implementation of signals which may be exchanged. An advantage of the present invention is that in a dispenser which has a capacitive sensor, effectively by mere adjustment of software relating to the capacitive sensor, the capacitive sensor may also be used as a communications device to provide for exchange of information with a controller. Of course, one remote controller may be used as, for example, to control as many dispensers as necessary, preferably, on a one by one basis with the hand held controller located in close proximity to each separate dispenser and/or having separate identification coding for each.

In use of automated soap dispensers incorporating a motor which is adapted to be activated to dispense fluid, is often advantageous to provide signals which are audible to a user which signals be given by the dispenser under a number of circumstances. Preferred audible signals include a signal to indicate initiation of dispensing of fluid, a signal to indicate termination of dispensing of fluid, a signal during the time fluid is being dispensed, a signal which will, after termination of dispensing, indicate that a sufficient period of time has passed after dispensing during which period of time preferably a user's hands were rubbed with the cleaning solution dispensed to provide adequate cleaning. For the period of time that a person should rub their hands as to clean their hands with fluid, a continuous signal or melody or periodic signals of the same or changing time frequency, may be audible during the period of time or, alternatively, at the end of the time period a signal may be given. Audible signals could also be provided under circumstances such as when the bottle is empty.

It has been known in the past to provide an audible signal using a separate loudspeaker or buzzer which is to be provided in the dispenser as a separate element.

In accordance with the present invention, the motor which is used to dispense fluid is used to provide audible signals. A preferred motor for use with the present invention is a reversible DC motor as, for example, preferably rotation at 300° rpm under six volt DC current. In normal operation for pumping, the pump is either rotated in one formal direction or the other rear direction. However, to provide an audible signal or noise, the motor is caused to vibrate at high frequencies, preferably, for example, frequencies in the range of 200 to 800 hertz as by shifting the motor between forward rotation and rear rotation rapidly. The quick switching at 200 to 800 times per second between forward rotation and rear rotation effectively provides an AC current to the DC motor. This results in the motor vibrating effectively at this frequency. Such vibration produces an audible signal. Changing the frequency of vibration with time can change the tone and pitch of the audible signal and can, for example, provide a musical melody, if desired.

With such preferred reversible motors, typical hardware provided with the motor provides mechanism for control of the direction the motor is rotated and prompt change of the direction of rotation. Adapting the motor for vibration to produce audible signals may typically be a matter of adjustment of the software controlling the operation of the motor without the need for additional hardware.

With high frequency vibration of the motor, vibrational energy may also be transferred to the remainder of the dispenser, depending upon the extent to which the motor may be mounted in a manner which is adapted to absorb or dampen vibration. Providing the dispenser to have portions which, in whole or in part, may vibrate can also be of assistance in providing additional audible sounds which would be apparent to a user not only audibly but also, possibly to some lesser extent, visually or tactilely through touch.

A control mechanism is provided to activate the motor so as to provide audible signals as may be desired.

Preferably, the audible signals would only be provided at a time when the motor is not operative to dispense as, for example, not moving the lever 45 in the preferred embodiment shown, either in an instroke or in an outstroke. For example, immediately prior to activating the motor to be dispensed, the motor may briefly be vibrated to generate an audible signal such as a short first buzz following which dispensing may be carried out as by movement of the lever 25 from an extended position to a retracted position and then returned to the extended position. After returning to the extended position, a timing mechanism could time the duration of time from the first buzz so as, for example, to provide 30 seconds after the first buzz a second buzz with the 30 second interval representing a preferred interval during which a person should rub their hands with the dispensed cleaning fluid. At the end of the 30 second interval, the motor could be activated to provide the second buzz as an audible signal indicating that the 30 second time period for washing has ended. The ability to provide an audible signal would be available in a dispenser with a preferred reversing motor whether the dispenser may be activated for automatic dispensing touchlessly or as by touching an activation button. Additionally, if such a dispenser, although having a reversible motor which is adapted for automated dispensing may be used manually, that is, for dispensing manually by operation of a lever without the need for automatic dispensing to operate the motor, the motor could still be used to provide auditory signals. It is to be appreciated that the mountings and various other devices, such as speed reducers, electrical connections and the like, will need to be adapted to withstand the stresses involved in vibration of the motor. Preferably, the connection of the motor to various other components will also be tuned so as to avoid through the vibration of the generation of disadvantageous sound as contrasted with preferred sounds which would be more in keeping in their character as to the nature of the signal to be emitted.

While the embodiment has been described with reference to preferred embodiments, many modifications and variations will now occur to persons skilled in the art.

We claim:

1. A pump mechanism comprising
  a piston chamber forming member defining a chamber disposed about a pump axis and a piston element reciprocally slidable coaxially in the chamber along the pump axis,
  a lever having a first end, a second end and pivotable about a fulcrum member,
  the first end coupled to the piston element for relative pivoting about a first lever axis normal to the pump axis, characterized in that during pivotal movement in a first direction, the lever pivots during a first angular segment of pivoting about a first pivot point and during a second angular segment of pivoting about a second pivot point spaced from the first pivot point, the second pivot point spaced from the first pivot point in a direction generally parallel to the pump axis, and the first pivot point and the second pivot point equidistant from the pump axis.

2. The pump mechanism as claimed in claim 1 wherein intermediate the first angular segment and the second angular segment, an intermediate position of the lever exists in which the lever is in engagement with the fulcrum member simultaneously at both pivot points and at which position one end of the lever moves from following an arcuate path about the first pivot point to an arcuate path about the second pivot point.

3. The pump mechanism as claimed in claim 2 wherein in pivoting of the lever through a third angular segment, a shoulder surface on the lever rolls in rolling engagement relative to a surface on the fulcrum member to move the first end of the lever relatively away from the fulcrum member as compared to an arcuate path of one of the pivot points.

4. The pump mechanism as claimed in claim 1 wherein the first pivot point and the second pivot point are spaced apart by a middle face.

5. The pump mechanism as claimed in claim 4 including a driver member coupled to the second end of the lever, the driver member reciprocally movable along a driver axis parallel the pump axis and spaced therefrom to pivot the lever about the fulcrum member.

6. The pump mechanism as claimed in claim 5 wherein the driver member is coupled to the second end of the lever to permit relative pivoting of the lever and driver member about a second lever axis parallel the first lever axis and normal to the driver axis and (b) relative sliding of the second end of the lever normal to the driver axis towards and away from the pump axis.

7. The pump mechanism as claimed in claim 1 wherein the fulcrum member is intermediate the first end of the lever and the second end of the lever.

8. The pump mechanism as claimed in claim 7 including a spring member biasing the lever into the fulcrum member.

9. The pump mechanism as claimed in claim 8 wherein during pivotal movement in the first direction in the lever pivoting through the first angular segment of pivoting about the first pivot point and subsequently through the second angular segment of pivoting about the second pivot point the first end of the lever follows a path which more closely approximates a straight line than a path the first end would follow if the lever were merely pivoted about one of the first pivot point and the second pivot point through both the first angular segment and the second angular segment.

10. The pump mechanism as claimed in claim 8 wherein the spring member engages the fulcrum member intermediate the first end of the lever and the second end of the lever.

11. The pump mechanism as claimed in claim 7 wherein
the fulcrum member including a fulcrum corner and a fulcrum apex defined at either end of a central fulcrum face,
the lever including a lever apex and a lever corner defined at either end of a mid fulcrum face,
a distance between the fulcrum corner and the fulcrum apex being equal to a distance between the lever apex and the lever corner,
the first pivot point defined by the fulcrum apex being received in the lever corner,
the second pivot point defined by the lever apex being received in the fulcrum corner,
in the intermediate position of the lever the fulcrum apex is received in the lever corner simultaneously with the lever apex being received in the fulcrum corner.

12. The pump mechanism as claimed in claim 11 wherein
the fulcrum corner is defined at the intersection of a first end of the central fulcrum face with a first fulcrum face which extends from the central fulcrum face toward the pump axis,
the fulcrum apex defined at the intersection of a second end of the central fulcrum face with a second fulcrum face which extends from the central fulcrum face away from the pump axis,
the lever apex is defined at the intersection of a first end of the mid lever face with a first lever face which extends from the mid lever face towards the pump axis,
the lever corner is defined at the intersection of a second end of the mid lever face with a second lever face which extends from the mid lever face away from the pump axis.

13. The pump mechanism as claimed in claim 12 wherein the central fulcrum face is parallel to the pump axis and the first fulcrum face is normal to the pump axis and directed towards the pump axis.

14. The pump mechanism as claimed in claim 13 wherein the first lever face is an arcuate convex surface and in pivoting of the lever through a third angular segment the first lever face on the lever rolls in rolling engagement relative to the first fulcrum face on the fulcrum member to move the first end of the lever relatively away from the fulcrum member as compared to an arcuate path of one of the pivot points.

15. The pump mechanism as claimed in claim 7 including
a helically threaded shaft disposed coaxial about the driver axis, a motor for selectively rotating the shaft about the driver axis in one direction and in an opposite direction,
the driver member threadably journalled on the shaft such that with rotation of the shaft the driver member moves axially on the shaft.

16. A pump mechanism comprising:
a piston chamber forming member defining a chamber disposed about a pump axis and a piston element reciprocally slidable coaxially in the chamber along the pump axis,
a lever having a first end, a second end and pivotable about a fulcrum member,
the first end coupled to the piston element for relative pivoting about a first lever axis normal to the pump axis, characterized in that during pivotal movement in a first direction, the lever pivots during a first angular segment of pivoting about a first pivot point and during a second angular segment of pivoting about a second pivot point spaced from the first pivot point,
the fulcrum member intermediate the first end of the lever and the second end of the lever,
the fulcrum member including a fulcrum corner and a fulcrum apex defined at either end of a central fulcrum face,
the lever including a lever apex and a lever corner defined at either end of a mid fulcrum face,
a distance between the fulcrum corner and the fulcrum apex being equal to a distance between the lever apex and the lever corner,
the first pivot point defined by the fulcrum apex being received in the lever corner,
the second pivot point defined by the lever apex being received in the fulcrum corner, in the intermediate position of the lever the fulcrum apex is received in the lever corner simultaneously with the lever apex being received in the fulcrum corner, the fulcrum corner defined at the intersection of a first end of the central fulcrum face with a first fulcrum face which extends from the central fulcrum face toward the pump axis, the fulcrum apex defined at the intersection of a second end of the central fulcrum face with a second fulcrum face which extends from the central fulcrum face away from the pump axis, the lever apex is defined at the intersection of a first end of the mid lever face with a first lever face which extends from the mid lever face towards the pump axis, the lever corner is defined at the intersection of a second end of the mid lever face with a second lever face which extends from the mid lever face away from the pump axis, the central fulcrum face is parallel to the pump axis and the first fulcrum face is normal to the pump axis.

17. The pump mechanism as claimed in claim 16 wherein the first lever face is an arcuate convex surface and in pivoting of the lever through a third angular segment the first lever face on the lever rolls in rolling engagement relative to the first fulcrum face on the fulcrum member to move the first end of the lever relatively away from the fulcrum member as compared to an arcuate path of one of the pivot points.

* * * * *